United States Patent
Pestov

(10) Patent No.: US 12,211,223 B2
(45) Date of Patent: Jan. 28, 2025

(54) SYSTEM AND METHOD FOR SETTING A VIEWPOINT FOR DISPLAYING GEOSPATIAL DATA ON A MEDIATED REALITY DEVICE USING GEOTAGS

(71) Applicant: VGIS INC., Toronto (CA)

(72) Inventor: Alexandre Pestov, Toronto (CA)

( * ) Notice: Subject to any disclaimer, the term of this patent is extended or adjusted under 35 U.S.C. 154(b) by 150 days.

(21) Appl. No.: 18/058,330

(22) Filed: Nov. 23, 2022

(65) Prior Publication Data

US 2024/0169565 A1  May 23, 2024

(51) Int. Cl.
G06T 7/33 (2017.01)
G06F 3/01 (2006.01)
G06T 7/73 (2017.01)
G06T 11/00 (2006.01)

(52) U.S. Cl.
CPC .............. G06T 7/344 (2017.01); G06F 3/011 (2013.01); G06T 7/74 (2017.01); G06T 11/00 (2013.01)

(58) Field of Classification Search
CPC . G06T 7/344; G06T 7/74; G06T 11/00; G06F 3/011
See application file for complete search history.

(56) References Cited

U.S. PATENT DOCUMENTS 9,542,778 B1 * 1/2017 Fouts ..................... G09G 5/377
10,152,665 B2 12/2018 Ardö et al.
10,311,643 B2 6/2019 Daniels et al.
10,373,035 B2 8/2019 Skans et al.
10,559,136 B2 2/2020 Daniels et al.
(Continued)

FOREIGN PATENT DOCUMENTS

CN 106169184 A 11/2016
CN 107346406 A 11/2017
(Continued)

OTHER PUBLICATIONS

International Search Report for PCT application No. PCT/CA2022/051565, CIPO, search completed: Mar. 13, 2023, mailed: May 26, 2023.

(Continued)

Primary Examiner — Sing-Wai Wu
Assistant Examiner — Khoa Vu
(74) Attorney, Agent, or Firm — Bhole IP Law; Anil Bhole; Marc Lampert

(57) ABSTRACT

A system and method for setting a viewpoint of a mediated reality (MR) device. A physical space including one or more geotags each communicating a position of such geotag in the physical space. The method including: determining a plurality of possible positions of the MR device in a coordinate system representing the physical space by determining a relative angle and distance to one or more of the geotags captured by the MR device; determining an orientation of the MR device in the coordinate system representing the physical space using the position information communicated by the one or more geotags; determining a position from the plurality of possible positions of the MR device, in the coordinate system representing the physical space, using the determined orientation of the MR device; and determining a viewpoint by aligning the determined position and orientation to a virtual position and pose in mediated reality space.

18 Claims, 13 Drawing Sheets

(56) References Cited

U.S. PATENT DOCUMENTS

| | | |
|---|---|---|
| 10,964,116 B2 | 3/2021 | Daniels et al. |
| 11,354,870 B2 | 6/2022 | Daniels et al. |
| 2008/0147325 A1 | 6/2008 | Maassel et al. |
| 2012/0249741 A1* | 10/2012 | Maciocci .............. G06T 19/006 348/51 |
| 2014/0368507 A1* | 12/2014 | Altman ................... G06T 17/05 345/426 |
| 2015/0354979 A1 | 12/2015 | Cengil |
| 2016/0134642 A1* | 5/2016 | Hamid .................. H04L 63/045 713/160 |
| 2016/0343137 A1 | 11/2016 | Skans et al. |
| 2017/0323187 A1 | 11/2017 | Ardö et al. |
| 2018/0005450 A1 | 1/2018 | Daniels et al. |
| 2019/0304199 A1 | 10/2019 | Daniels et al. |
| 2020/0098189 A1 | 3/2020 | Pavloff et al. |
| 2020/0273256 A1 | 8/2020 | Daniels et al. |
| 2020/0401617 A1* | 12/2020 | Spiegel ................. G06F 16/587 |
| 2021/0019913 A1 | 1/2021 | Huang et al. |
| 2021/0056760 A1 | 2/2021 | Cowburn et al. |
| 2021/0152976 A1* | 5/2021 | Daoura ............. H04W 52/0254 |
| 2021/0264675 A1 | 8/2021 | Daniels et al. |
| 2021/0333121 A1* | 10/2021 | Pestov .................... G01S 19/14 |
| 2022/0301192 A1* | 9/2022 | Boardman ............. G06T 7/579 |

FOREIGN PATENT DOCUMENTS

| | | |
|---|---|---|
| CN | 107346406 B | 4/2019 |
| EP | 3096290 A1 | 11/2016 |
| EP | 3242245 A1 | 11/2017 |
| EP | 3242245 B1 | 6/2018 |
| JP | 2017021328 A | 1/2017 |
| JP | 2017224282 A | 12/2017 |
| JP | 6473475 B2 | 2/2019 |
| JP | 6484587 B2 | 2/2019 |
| KR | 20160136233 A | 11/2016 |
| KR | 20170125726 A | 11/2017 |
| KR | 20180081028 A | 7/2018 |
| KR | 101913371 B1 | 10/2018 |
| KR | 102019412 B1 | 9/2019 |
| RU | 2668730 C1 | 10/2018 |
| TW | 201710997 A | 3/2017 |
| TW | 201741934 A | 12/2017 |
| TW | I657377 B | 4/2019 |
| WO | 2016077506 A1 | 5/2016 |
| WO | 2016077506 A8 | 5/2017 |

OTHER PUBLICATIONS

Notice of Allowance for U.S. Appl. No. 17/443,271, USPTO, dated: Sep. 15, 2023.
Notice of Allowance for U.S. Appl. No. 17/497,377, dated: Sep. 1, 2023.
Written Opinion of the International Searching Authority for PCT application No. PCT/CA2022/051565, CIPO, opinion completed: May 26, 2023, mailed May 26, 2023.

* cited by examiner

SYSTEM AND METHOD FOR SETTING A VIEWPOINT FOR DISPLAYING GEOSPATIAL DATA ON A MEDIATED REALITY DEVICE USING GEOTAGS

TECHNICAL FIELD

The following relates generally to mediated reality (MR) devices; and more particularly, to systems and methods for defining, calibrating, and correcting a mediated reality (MR) viewpoint using geotags.

BACKGROUND

Surveying firms, engineering and construction companies, municipalities, public utilities, and many other entities, collect, store, use, and disseminate vast amounts of geospatial data. This geospatial data can be used to manage daily operations and conduct mission-critical tasks; for example, asset maintenance, construction plan design, zoning proposals, among many others.

Mediated reality (MR) systems, including augmented reality (AR), mixed reality, and virtual reality (VR), provide interactive experiences with a real-world and/or virtual world environment. In such cases, objects that reside in the real world can be augmented or represented by computer-generated perceptual information. As an application of such mediated reality systems, geospatial data can be augmented or represented to a user in comparison to real-world object (or asset) locations. However, often the locations of such digital representations are inaccurate in comparison to the real-world objects they represent.

SUMMARY

In an aspect, there is provided a computer-executable method for setting a viewpoint for displaying of geospatial object data on a mediated reality (MR) device in relation to a physical space, the physical space comprising one or more geotags each communicating a position of such geotag in the physical space, the method comprising: determining a plurality of possible positions of the MR device in a coordinate system representing the physical space by determining a relative angle and distance to one or more of the geotags captured by the MR device; determining an orientation of the MR device in the coordinate system representing the physical space using the position information communicated by the one or more geotags captured by the MR device; determining a position from the plurality of possible positions of the MR device, in the coordinate system representing the physical space, using the determined orientation of the MR device; determining a viewpoint by aligning the determined position and orientation in the coordinate system representing the physical space to a virtual position and pose in a coordinate system in a mediated reality space; and outputting the viewpoint.

In a particular case of the method, determining the position of the MR device comprises determining two positions, each of the two physical positions are determined relative to a first and a second of the geotags captured by the MR device, the position of the MR device is tracked between capturing of the first and the second of the geotags, and wherein the orientation is determined by establishing consistency of the alignments of the coordinate system representing the physical and the mediated reality space coordinate system at the two positions.

In another case of the method, the physical orientation is determined by receiving manual setting of the orientation.

In yet another case of the method, the method further comprising tracking movements of the mediated reality device in the physical space and periodically correcting the viewpoint in the mediated reality space by determining the position of the MR device, determining the orientation of the MR device, and determining the viewpoint by aligning the determined position and orientation to the virtual position and pose in the mediated reality space.

In yet another case of the method, outputting the viewpoint comprises displaying the geospatial model by the mediated reality device using the viewpoint.

In yet another case of the method, the one or more geotags comprise a quick response code, a radio-frequency identification tag, a near field communication tag, or a Bluetooth beacon.

In yet another case of the method, aligning the determined position and orientation in the coordinate system representing the physical space to the virtual position and pose in the mediated reality space coordinate system comprises aligning a coordinate system grid in the coordinate system representing the physical space to a grid in the mediated reality coordinate system.

In yet another case of the method, the one or more geospatial models comprise a plurality of geospatial models, the method further comprising harmonizing projection systems in the plurality of geospatial models.

In yet another case of the method, the position of each geotag in the physical space is determined by surveying the physical space or by retrieving a position from the one or more geospatial models.

In yet another case of the method, the geospatial model comprises a reality capture model, computer-aided design (CAD) model, a GIS model, or a building information modeling (BIM) model.

In another aspect, there is provided a system for setting a viewpoint for displaying of geospatial object data on a mediated reality (MR) device in relation to a physical space, the physical space comprising one or more geotags each communicating a position of such geotag in the physical space, the system comprising one or more processors in communication with a data storage to execute: a mediated reality module to determine a plurality of possible positions of the MR device in a coordinate system representing the physical space by determining a relative angle and distance to one or more of the geotags captured by the MR device, to determine an orientation of the MR device in the coordinate system representing the physical space using the position information communicated by the one or more geotags captured by the MR device, and to determine a position from the plurality of possible positions of the MR device, in the coordinate system representing the physical space, using the determined orientation of the MR device; an orientation module to determine a viewpoint by aligning the determined position and orientation in the coordinate system representing the physical space to a virtual position and pose in a coordinate system in a mediated reality space; and an output module to output the viewpoint.

In a particular case of the system, determining the position of the MR device comprises determining two positions, each of the two positions are determined relative to a first and a second of the geotags captured by the MR device, the position of the MR device is tracked between capturing of the first and the second of the geotags, and wherein the orientation is determined by establishing consistency of the alignments of the coordinate system representing the physical space and the mediated reality space coordinate system at the two positions.

In another case of the system, the orientation is determined by receiving manual setting of the orientation.

In yet another case of the system, the system further comprising a tracking module to track movements of the mediated reality device in the physical space, wherein the orientation module periodically corrects the viewpoint in the mediated reality space by aligning an updated position and an updated orientation, both determined by the mediated reality module, to the virtual position and pose in the mediated reality space.

In yet another case of the system, outputting the viewpoint comprises displaying the geospatial model by the mediated reality device using the viewpoint.

In yet another case of the system, the one or more geotags comprise a quick response code, a radio-frequency identification tag, a near field communication tag, or a Bluetooth beacon.

In yet another case of the system, aligning the determined position and orientation in the coordinate system representing the physical space to the virtual position and pose in the coordinate system in the mediated reality space comprises aligning a coordinate system grid in the coordinate system representing the physical space to a grid in the mediated reality coordinate system.

In yet another case of the system, the one or more geospatial models comprise a plurality of geospatial models, the method further comprising harmonizing projection systems in the plurality of geospatial models.

In yet another case of the system, the position of each geotag in the physical space is determined by surveying the physical space or by retrieving a position from the one or more geospatial models.

In yet another case of the system, the geospatial model comprises a reality capture model, computer-aided design (CAD) model, a GIS model, or a building information modeling (BIM) model.

These and other aspects are contemplated and described herein. It will be appreciated that the foregoing summary sets out representative aspects of the system and method to assist skilled readers in understanding the following detailed description.

BRIEF DESCRIPTION OF THE DRAWINGS

A greater understanding of the embodiments will be had with reference to the figures, in which.

DETAILED DESCRIPTION

Figure 1:
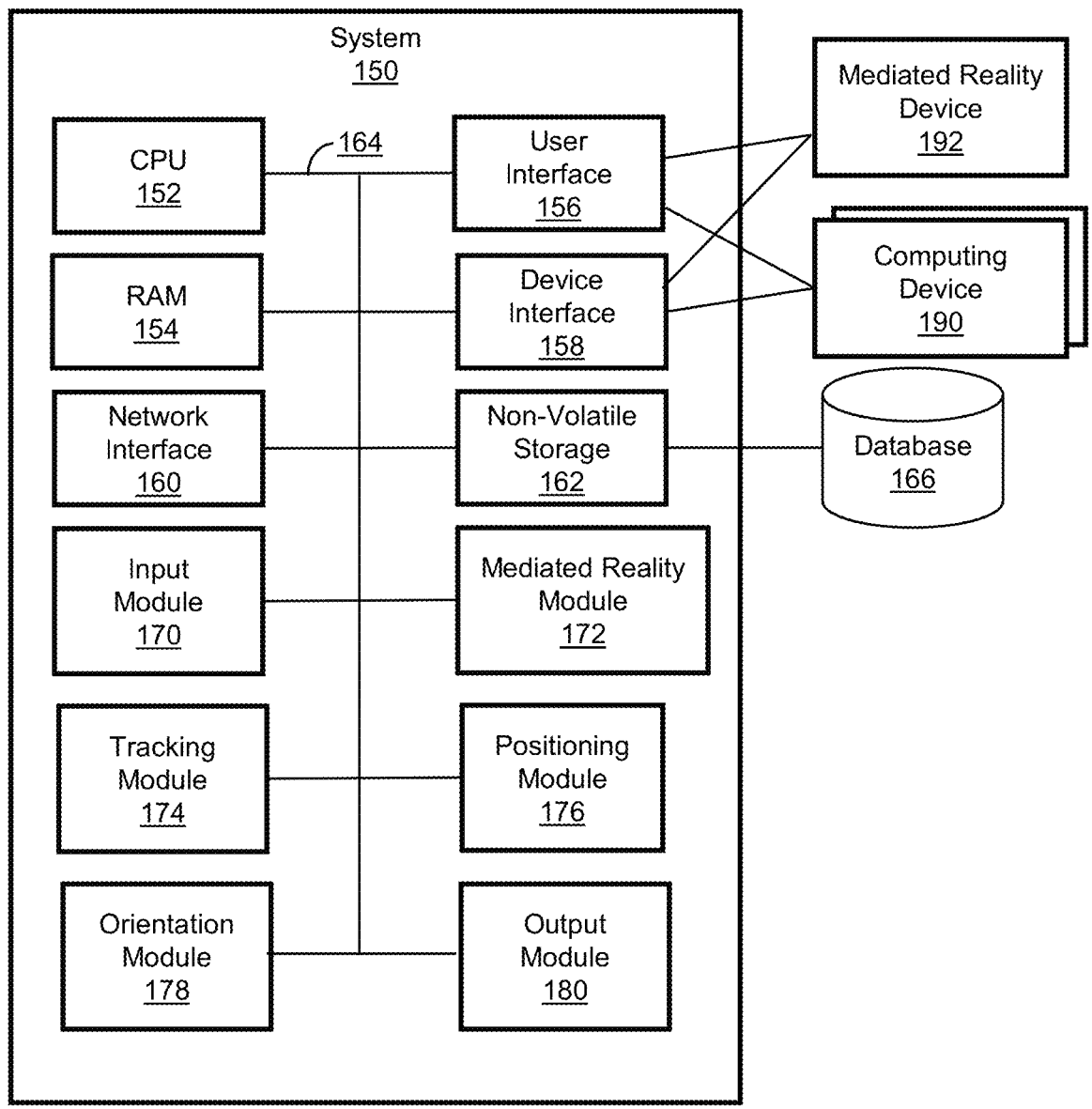
FIG. 1 illustrates a diagram of a system for correcting mediated reality (MR) viewpoint positioning using geotags, according to an embodiment.

Embodiments will now be described with reference to the figures. For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures, and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine, or device exemplified herein that executes instructions may include or otherwise have access to computer-readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer-readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information, and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application, or module herein described may be implemented using computer readable/executable instructions that may be stored or otherwise held by such computer-readable media and executed by the one or more processors.

While the following disclosure refers to mediated reality, it is contemplated that this includes any suitable mixture of virtual aspects and real aspects; for example, augmented reality (AR), mixed reality, modulated reality, holograms, and the like. The mediated reality techniques described herein can utilize any suitable hardware; for example, smartphones, tablets, mixed reality devices (for example, Microsoft™ HoloLens™), true holographic systems, purpose-built hardware, and the like.

The locations of digital representations of real-world objects or assets, such as those used in mediated reality, can often be inaccurate in comparison to the real-world objects they represent or are situated with respect to. In some cases, positioning and directional accuracy can be improved by integrations with global navigation satellite systems (GNSS) and similar high-precision surveying instruments. The resulting MR visuals can be displayed with centimeter-level accuracy, but only within a narrow range of real-life scenarios where GNSS devices can function properly. In places where GNSS devices do not function, the accuracy of the digital representations substantially suffers. Embodiments of the present invention provide a positioning approach that uses geotags to advantageously remedy inaccuracies in the positioning of the digital objects. Geotags referred to herein can be any suitable medium that can communicate encoded information relating to a position in real-space; for example, nearfield communication tags (such as Airtags™), quick response (QR) codes, barcodes, NFC tags, RFID tags, Bluetooth™ beacons, image recognition identifiers, or other suitable approaches for communicating information to the MR device.

Figure 4:
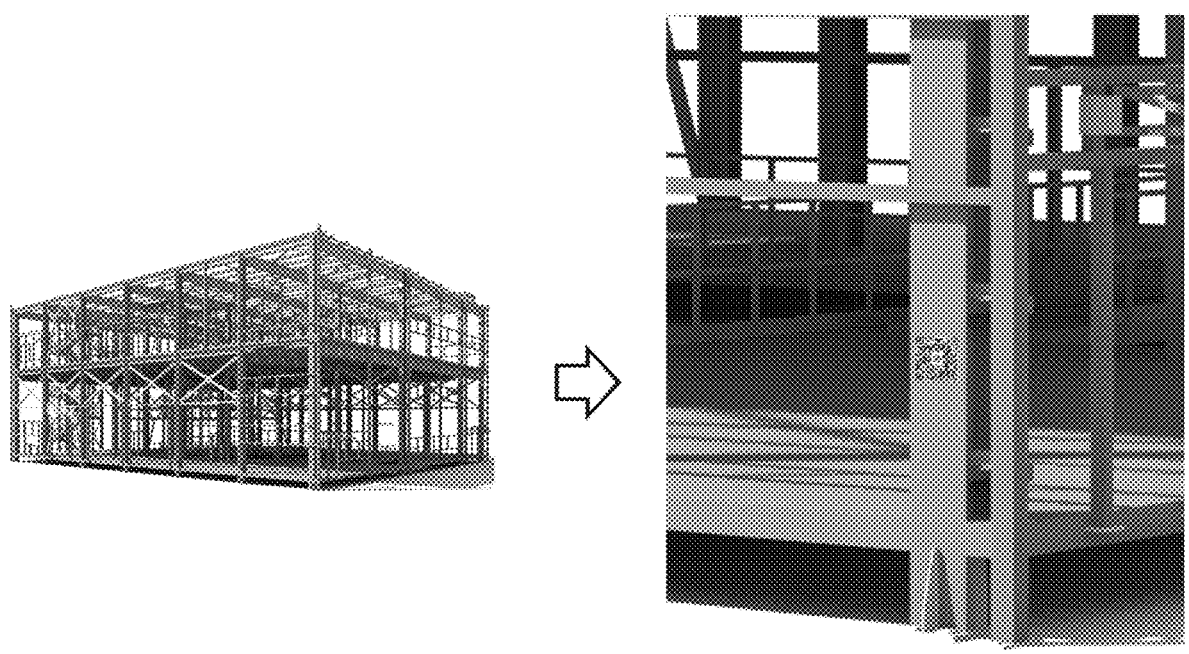
FIG. 4 illustrates an example of placing of geotags, in this case QR codes, within the geospatial model.
Figure 5:
FIG. 5 illustrates an example of scanning a geotag with a mediated reality device to receive its location information.

Visual codes, such as QR codes, can be used for placing objects in mediated reality, for example, in the construction industry. In some cases, the QR code workflow can include:
  After the model of the constructed objects is generated using computer-aided design (CAD), a reality capture model, a GIS model, and/or Building Information Modeling (BIM) software, it can be duplicated and simplified for MR.
  During the simplification process, QR codes can be embedded inside the model as shown on FIG. 4.
  Multiple QR codes can be placed in the model to ensure required density of QR codes.
  The location of QR codes inside the model can be recorded and associated QR codes can be printed on the associated objects in the virtual representation.
  Site personnel can identify the location in the physical space and attach printed QR codes to that location.
  Users can then scan QR codes as illustrated in FIG. 5.
  The MR device can then match the scanned QR code to the QR code located inside the virtual model and display the model relative to the scanned QR code.

Although the above approach can work, it has numerous shortcomings. For example, the above approach requires modification to the source model; whereas typically, the BIM model is developed and provided by an engineering department or an engineering company, and not by the users. Changes to the source model: (1) require manual processing, which has a significant time and cost associated therewith; (2) are not always possible, as only the original designer may have edit rights to the model and the designer may not have the knowledge/tools/skills/time to update the model with QR codes; (3) involve model tampering because, as the model is changed, its integrity cannot be guaranteed after the QR code injection; (4) require duplication of the model by creating multiple working copies of the same BIM model, which may lead to mistakes during the construction phase; (5) have a significant time lag because the model needs to be updated with QR codes, and accordingly, the model might be outdated by the time QR codes are added to the model; and (6) require the whole QR code insertion to be redone if the model or part of the model changes, which are very common during construction.

Additionally, the above approach generally requires placing matching QR codes in the exact physical location corresponding to the QR code within the source model; often requiring sub-centimetre accuracy. This accuracy requirement may lead to: (1) mistakes during the process of placing QR codes within the model because QR codes are incorrectly placed in the BIM model; (2) duplicated QR codes placed around the job site due to printing mistakes or the like; (3) incorrect order of placement of QR codes in the physical space, where printed QR codes are placed out of order and lead to mislabelling; and (4) incorrect placement of QR codes in the physical space due to measurement issues.

Even if QR codes are correctly placed in the source model and the physical space, the physical space may not correspond to the model. For example, walls are often reconfigured and moved. The user may place the QR code on a specific point on the wall. However, the wall that the user is placing the QR code on may have been moved without the user's knowledge. So despite accurately measuring the point on the wall, the user unknowingly places the QR code several meters away from the intended location because the wall was moved, and the model was not updated. This would lead to the false confidence in visuals and mistakes/delays/cost overruns during construction.

Since the process of injecting QR codes is a very manual process and must be repeated for every model change, model designers will usually not be predisposed to place many QR codes within the model; as it requires substantial time and effort investment. Without high-precision positioning instrument support, mediated reality visuals will likely "drift" or gradually move out of alignment due to small inaccuracies in mediated reality positioning tracking. The solution is to re-scan QR codes when the drift is noticed. However, since the designers may not invest sufficient time into placing QR codes with suggested density (e.g., every 10 m-30 m), the user may not have QR code nearby to correct the drift, which will lead to usability problems for the mediated reality system, as it will display inaccurate visuals.

These and several other problems render the above QR code approach impractical for many real-life scenarios.

The present embodiments overcome the substantial disadvantages of other approaches by placing geotags in an efficient manner that, for example, can fit into existing construction or asset management workflows. A user can measure locations (e.g., around a construction site) using high-accuracy measuring equipment (e.g., GNSS/RTK devices, Total Station, or the like); particularly, locations in space in a predefined coordinate system. The user creates a geotag for each location with each measured location embedded, represented, or otherwise stored associated with the geotag. For example, placing geotags around a physical space similar to how surveyors place survey points around a construction site. The geotag can be printed and attached to the measured point (e.g., printed on a portable printer and taped to a wall) or, in the case of RFI Ds or airtags, glued or otherwise secured to the measured point.

Advantageously, geospatial data (e.g., BIM, three-dimensional scans, or other reality data captures) and mediated reality model do not require being changed to reflect the geotags; as long as the model is georeferenced so that it can be projected using the same projection system as used for the geotags and geospatial data.

Once the geotag information is received, a distance and direction to the geotag can be determined. This allows a determination of orientation of the MR device based on the determined distance and direction and the geotag's communicated positioning information. Upon detecting its own position, the mediated reality device can display the model with an accurate position as the location of the model in space is known based on the projection system within the model.

In some cases, geospatial data can be located on a database after having been collected using any suitable approach. For example, using geographic information systems (GIS) using, for example, Total Station, high-precision global navigation satellite systems (GNSS) and/or real-time kinematic (RTK) positioning. Advantageously, the present embodiments employ advanced visualization technologies, such as mediated reality techniques, to work in conjunction with other data collection techniques, such as visual positioning systems, to adjust and/or correct the positioning of representations of geospatial data.

Turning to FIG. 1, a system for correcting mediated reality (MR) viewpoint positioning using geotags 150 is shown, according to an embodiment. In this embodiment, the system 150 is run on a local computing device (for example, a mobile device). In further embodiments, the system 150 can be run on any other computing device; for example, a server, a dedicated price of hardware, a laptop computer, a smartphone, a tablet, a mixed reality device (for example, a Microsoft™ HoloLens™), true holographic systems, purpose-built hardware, or the like. In some embodiments, the components of the system 150 are stored by and executed on a single computing device. In other embodiments, the components of the system 150 are distributed among two or more computer systems that may be locally or remotely distributed; for example, using cloud-computing resources.

FIG. 1 shows various physical and logical components of an embodiment of the system 150. As shown, the system 150 can have a number of physical and logical components, including a processing unit ("CPU") 152 (comprising one or more processors), random access memory ("RAM") 154, a user interface 156, a device interface 158, a network interface 160, non-volatile storage 162, and a local bus 164 enabling CPU 152 to communicate with the other components. The CPU 152 executes an operating system, and various modules, as described below in greater detail. RAM 154 provides relatively responsive volatile storage to CPU 152. The user interface enables an administrator or user to provide input via an input device, for example a mouse or a touchscreen. The user interface 156 also outputs information to output devices; for example, a mediated reality device 192, a display or multiple displays, a holographic visualization unit, and the like. The mediated reality device 192 can include any device suitable for displaying augmented or mixed reality visuals; for example, smartphones, tablets, holographic goggles, purpose-built hardware, or other devices. The mediated reality device 192 may include other output sources, such as speakers. In some cases, the system 150 can be collocated or part of the mediated reality device 192. In some cases, the user interface 156 can have the input device and the output device be the same device (for example, via a touchscreen).

The network interface 160 and/or the device interface 158 permits communication with other systems or devices, such as other computing devices and servers remotely located from the system 150. The device interface 158 can communicate with one or more other computing devices 190 that are either internal or external to the system 150; for example, a GNSS receiver to capture a position and/or elevation, a camera or camera array to capture image(s) of a scene, sensors for determining position and/or orientation (for example, time-of-flight sensors, compass, depth sensors, spatial sensors, inertial measurement unit (IMU), laser mapping, and the like). In some cases, at least some of the computing devices 190 can be collocated or part of the mediated reality device 192. In some embodiments, the device interface 158 can receive and send data to other devices, such as positions, elevations, and images, which have been previously captured, from the local database 166 or a remote database via the network interface 160.

Non-volatile storage 162 stores program instructions, such as an operating system and programs, and including computer-executable instructions for implementing the operating system and modules, as well as any data used by these services. Additional stored data can be stored in a database 166. During operation of the system 150, the operating system, the programs, the modules, and the related data may be retrieved from the non-volatile storage 162 and placed in RAM 154 to facilitate execution.

In an embodiment, the system 150 further includes a number of functional modules to be executed on the one or more processors 152, including an input module 170, a mediated reality (MR) module 172, a tracking module 174, a positioning module 176, an orientation module 178, and an output module 180. In further cases, the functions of the modules can be combined or executed by other modules.

Figure 2:
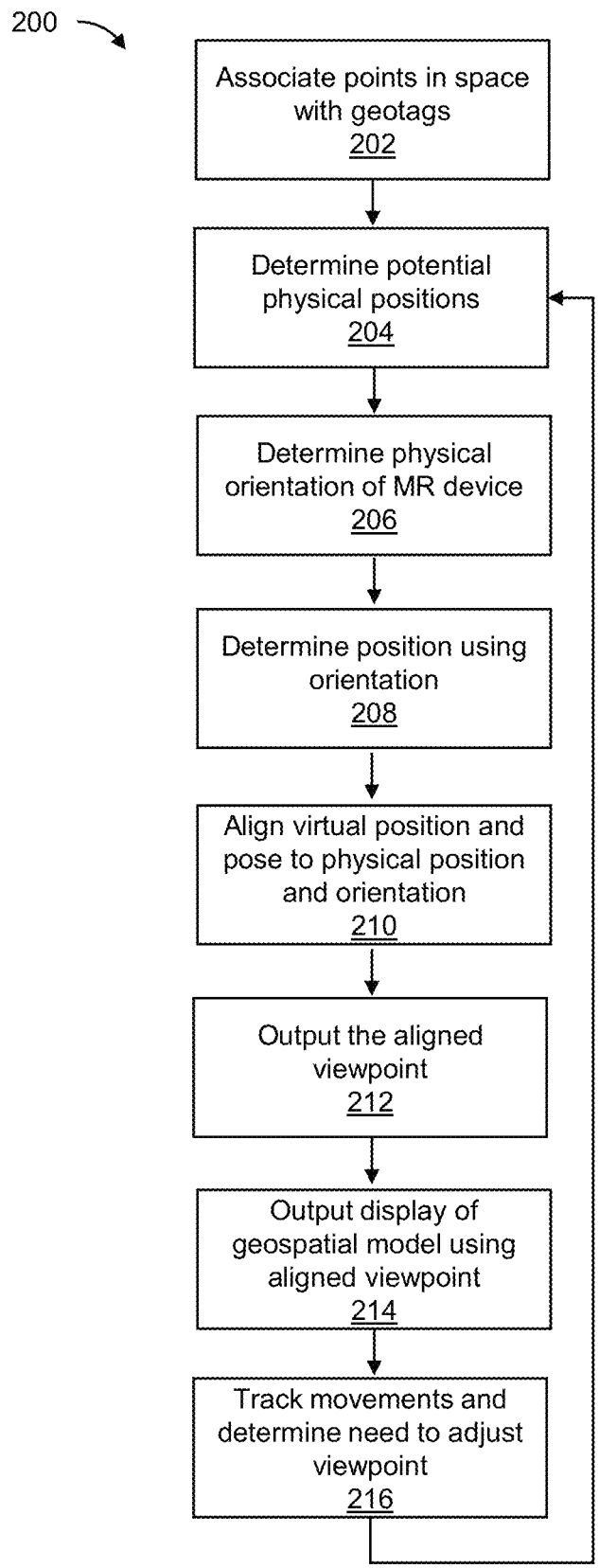
FIG. 2 illustrates a flow diagram of a method for correcting mediated reality (MR) viewpoint positioning using geotags, according to an embodiment.

FIG. 2 illustrates a method of correcting mediated reality (MR) viewpoint positioning using geotags 200, according to an embodiment.

At block 202, geotags are associated with, at least some of, the points in physical space; for example, affixed or mounted to objects at such points. Each geotag is programmed, or fashioned, to display or communicate the location information for the point in space to which it is associated. In some cases, the positioning module 176 can be used to determine, or receive via the input module 170, location information associated with the geotags, as described herein, and program, or fashion (such as instruct a printer to print), the geotags to communicate such information.

Figure 10:
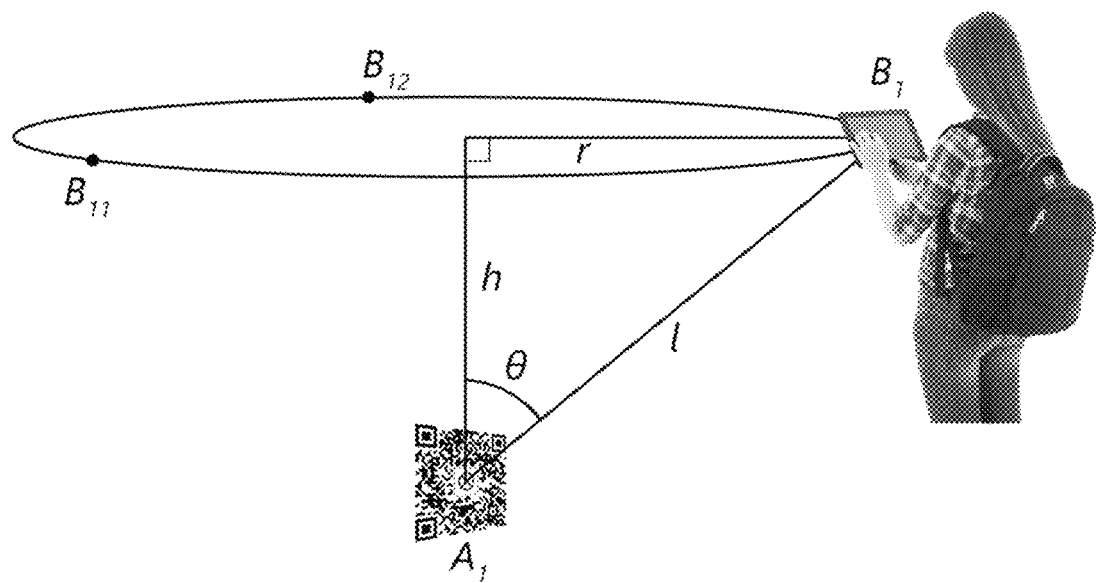
FIG. 10 is a diagram illustrating an example of a range of possible coordinates of the MR device after detecting its position relative to a geotag.

At block 204, the mediated reality module 172 captures one of the geotags (i.e., with its camera) and determines a plurality of potential physical positions of the mediated reality device 192 by determining a relative angle and distance to the captured geotag. The approximate physical position general comprises a number of possible positions; i.e., any of the positions along the circle depicted in FIG. 10.

Figure 11:
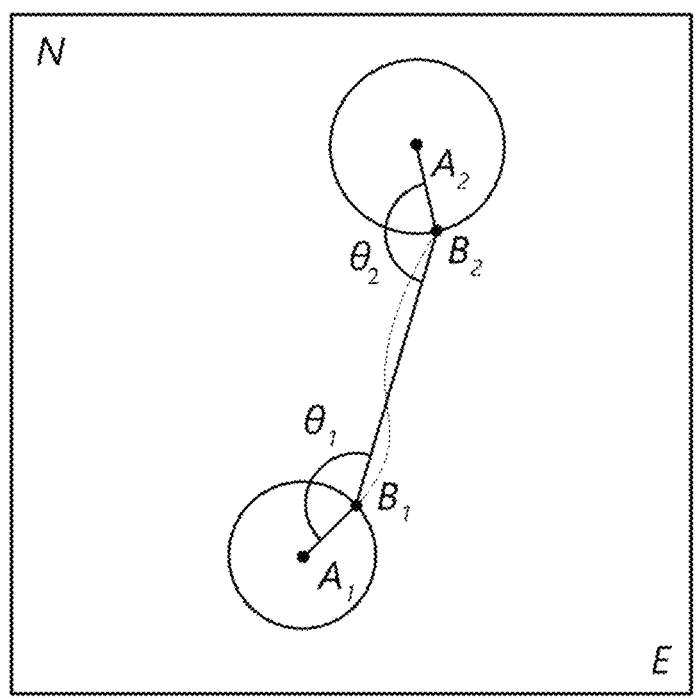
FIG. 11 is a diagram illustrating an example of detection of the MR device's coordinate position and orientation in a N-E coordinate plane after detecting its position relative to two geotags placed in the same coordinate plane.

At block 206, the mediated reality module 172 determines a physical orientation of the mediated reality device 192. In a first approach, the orientation can be determined by determining a first position by capturing a first of the geotags, as described in block 204, tracking movement of the mediated reality device 192, and determining a second position by capturing a second of the geotags. The position of the mediated reality device 192 is tracked in between capturing these geotags. As both the first position and the second position generally have a range of possible positions, the mediated reality module 172 determines the physical orientation by establishing consistency of the alignments of the physical coordinate system and the mediated reality space coordinate system performed with respect to the first position and the second position. For example, by determining a line between the first position and the second position to determine the physical orientation; as illustrated in FIG. 11.

In another approach, the orientation can be determined by manually, via the input module 170, setting the orientation of the mediated reality device in the projection system used for determining the position of the geotags.

At block 208, the mediated reality module 172 determines the position of the mediated reality device 192 from the plurality of possible positions using the determined orientation of the MR device, as described with respect to the first approach or the second approach.

At block 210, using the determined physical position and orientation, the orientation module 178 can determine a position of the viewpoint of the mediated reality device 192 in the projection system by aligning, or otherwise matching, a virtual position and pose of the mediated reality device 192 in mediated reality space to the position and orientation of the viewpoint of the mediated reality device 192 in physical space. In some cases, such alignment can include taking a grid in the physical coordinate system and aligning it to a grid in the mediated reality space coordinate system.

At block 212, the output module 180 can output the viewpoint.

In some cases, at block 214, the input module 170 can receive one or more virtual geospatial models representative of the physical space, the geospatial models including geospatial objects and other data in a projection (coordinate) system. The geospatial data and model can be generated using computer-aided design (CAD), a GIS model, reality capture software, Building Information Modeling (BIM) software, or the like. It is understood that geospatial objects can include any suitable object to be displayed; such as, walls, posts, fences, furniture, ceilings, curbs, grates, or the like. The output module 180 can output a display of the geospatial model in the mediated reality view using the virtual position and pose determined at block 210.

In some cases, at block 216, the tracking module 174 can periodically or continuously track movements of the mediated reality device 192 in the physical space and adjust the virtual pose of the device 192, as described above, if needed to maintain adherence of the virtual position and pose with respect to the physical space.

Figure 3:
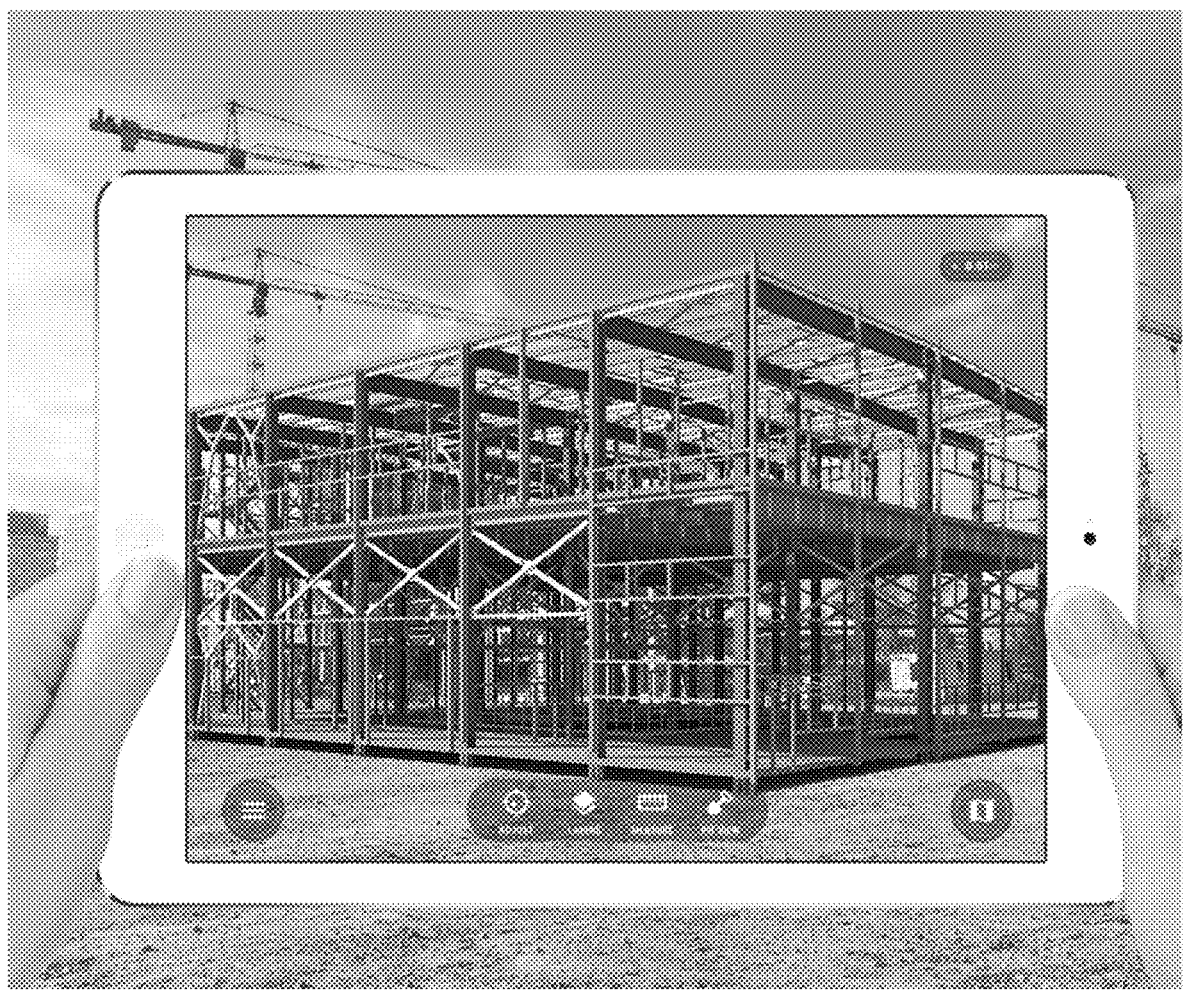
FIG. 3 illustrates an example of using a mediated reality device to view geospatial model placed at a construction site.

FIG. 3 illustrates an example of a user using the mediated reality device 192 (a tablet computer) to view an object in the geospatial data (a model of a structure) superimposed on an image captured by the camera, or a virtual representation. The camera can be part of the mediated reality device 192, a stand-alone computing device 190, or part of another computing device 190. In some cases, there can be multiple cameras. In some cases, the mediated reality device 192, the mediated reality module 172, or a combination, can determine position using computer vision recognition of objects in the environment. In some cases, the mediated reality device 192 can include one or more other sensors to determine position and/or orientation; for example, accelerometers, inertial sensors, and/or gyroscopes. Position can include a coordinate (for example, three-dimensional) representing the relative position of the mediated reality device 192, can include an orientation (for example, a three-dimensional vector), and/or can include representations of the relative heading or direction of the mediated reality device 192. The mediated reality module 172 can determine position and orientation periodically, or at any suitable time.

For accurate placement of the geospatial object relative to the environment by the mediated reality device 192, physical positioning and orientation are determined. Generally, due to inherent inaccuracies, tracking of the MR device movements in space over time using internal instruments (gyroscopes, accelerometers, cameras, etc.), the MR device will always track and calculate its movement with some margin of error. Over time, that error will accumulate as the user moves and rotates in space. In this way, positioning and tracking data generally has unsatisfactory accuracy and is prone to drift over time and distance. Thus, the MR device's position and orientation in MR space must be corrected (i.e., reconciled) with respect the physical space, using the method 200. For example, from time-to-time to ensure proper placement of the digital representations of certain geospatial objects relative to its environment to accurately match real-world positioning.

The present inventor determined that visual tags, such as QR codes, can be used to aid in the above matching and efficiently correct inaccuracies in the placement of digital objects.

Geospatial models may have a global or local site coordinate system (referred to as a projection system). In some cases, where the system 150 receives different models and those models have different projection systems, these projection systems may need to be harmonized around a single projection system; such as those used at a construction or job site. In many cases, the harmonization will not be required as the various models will already have the same projection system.

In an example setting of the present embodiments, most construction sites, such as civil engineering, heavy construction or building construction, will operate with a projection system. The projection system defines the location of the point of origin (or zero value) and coordinates are tracked relative to the established point of origin using easting, northing and elevation values; where northing is a figure or line representing northward distance on a map and easting a FIG. or line representing eastward distance on a map. In most cases, models produced by design team will be done using the same projection system. However, in some cases, different projection systems can be used, such as where the models come from different parties.

Figure 6:
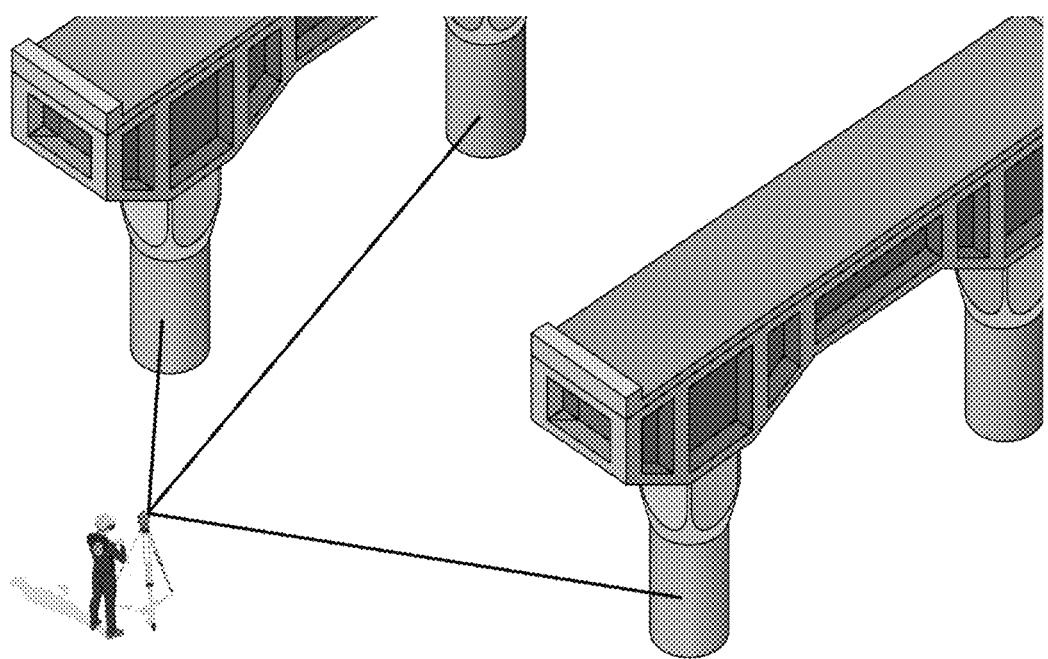
FIG. 6 illustrates an example of identifying coordinates of three physical points in a projection system using surveying equipment.

At block 210, the input module 170 can receive locations of the geotags, where such locations can be identified by administrators, users, site personnel, or other individuals. Accordingly, a location (e.g., $X_{11}$, $Y_{11}$, $Z_{11}$) of a physical point $A_1$ is associated with a geotag, $G_1$, placed at the physical point $A_1$ in the projection system. In a particular case, this location identification can be performed using surveying equipment or similar tools on-site; as exemplified in FIG. 6. For one or more of the identified locations, a geotag will be created that displays or broadcasts the location information associated with that specific geotag; for example, northing/easting/elevation of the point in a site coordinate system, latitude/longitude/elevation in a global coordinate system, or other values that represent a location in the projection system. Alternatively, if site measurements cannot be performed, geotag coordinates can be retrieved directly from the geospatial model and placed in associated positions in the real-world physical space.

Geotags can be placed at any suitable distance from each other; however, the present inventors have determined that placing geotags 10 to 25 meters apart from each other provides an optimal density for smoother user experience.

In this way, each geotag represents a physical point in space where it is placed. The geotag communicates the coordinates of that point, and thus, do not necessarily need to be catalogued or tracked. In most cases, the process of placing geotags needs to be completed only once; unless the physical space changes or the site projection system is modified. Advantageously, the geotags are disassociated from any site model used in construction, and site models can continue to be designed and modified without impacting geotags or requiring relabeling of the site. This offers a number of advantages for improved accuracy and the ability to modify and re-work the model; which are substantial limitations on other approaches.

Figure 7:
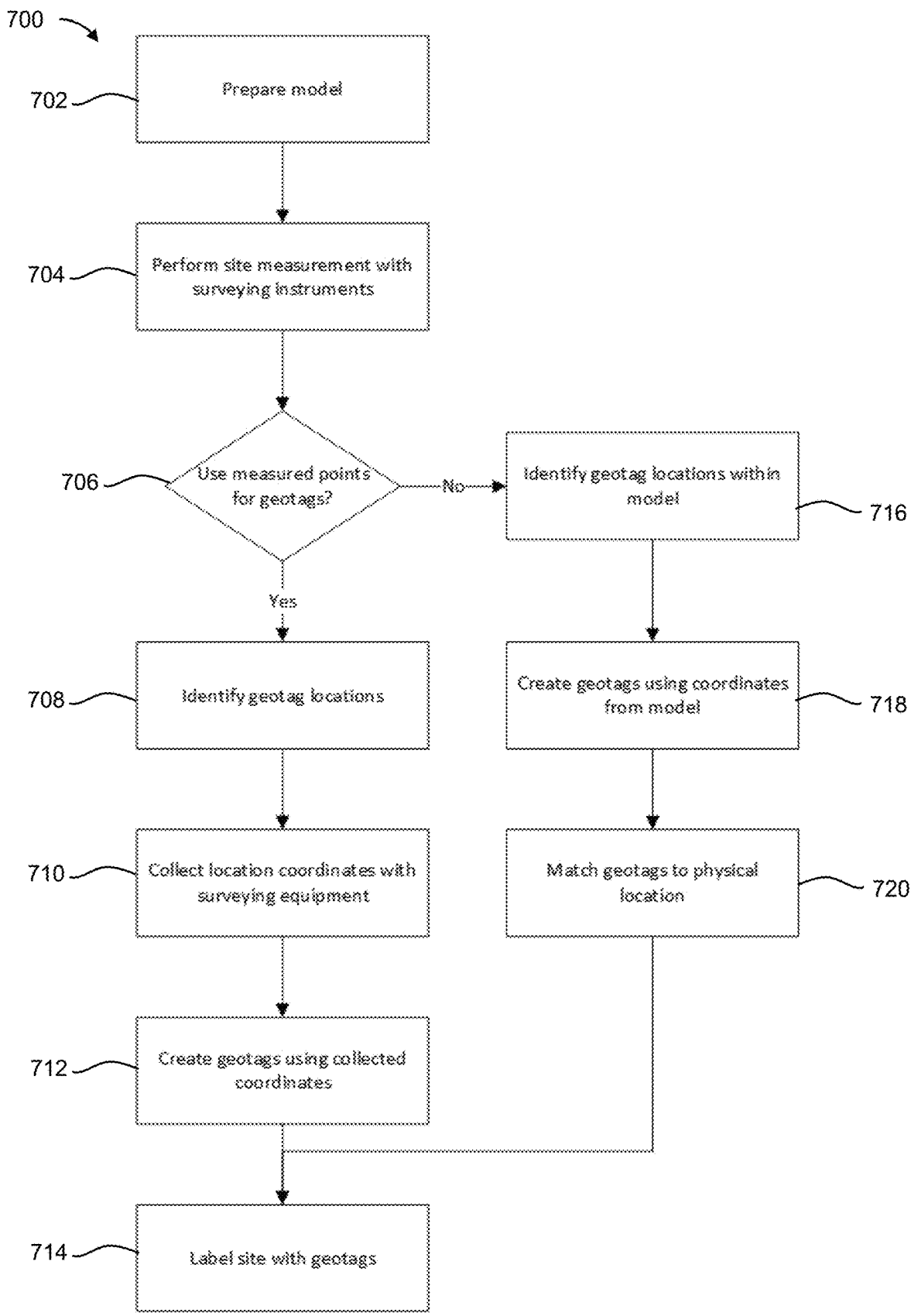
FIG. 7 illustrates an example approach for placing geotags around a physical space.

FIG. 7 illustrates an example approach 700 for labelling a physical space with geotags; however, it should be appreciated that any suitable approach for placing geotags can be used. At block 702, the geospatial model(s) are prepared and preprocessed; such as by harmonizing projection systems. At block 704, site measurements are obtained such as with the use of surveying instruments. At block 706, a determination can be made as to whether the measured points are suitable for determining geotag placement. If the measurements are suitable, then at block 708, geotag locations can be identified at a plurality of the measured points. At block 710, location information (e.g., coordinates) is collected for each of the placed geotags. At block 712, geotags are created in the model with the collected location information. If the measurements are not suitable, at block 716, geotag locations can be identified in the virtual model. At block 718, geotags are created in the model with the coordinates identified in the model. At block 720, the locations of the geotags can be matched to locations in the physical space. At block 714, the physical space is labelled with the geotags at the identified locations.

Once the physical space (e.g., a construction site) is labelled with the geotags, users (e.g., construction workers and engineers) can begin utilizing the geotags for their mediated reality applications. The mediated reality module 172 determines a position (e.g., $X_{21}$, $Y_{21}$, $Z_{21}$) of the mediated reality device's viewpoint (i.e., camera), $B_1$, relative to the location of a first of the physical points, $A_1$, in the projection system.

Figure 8:
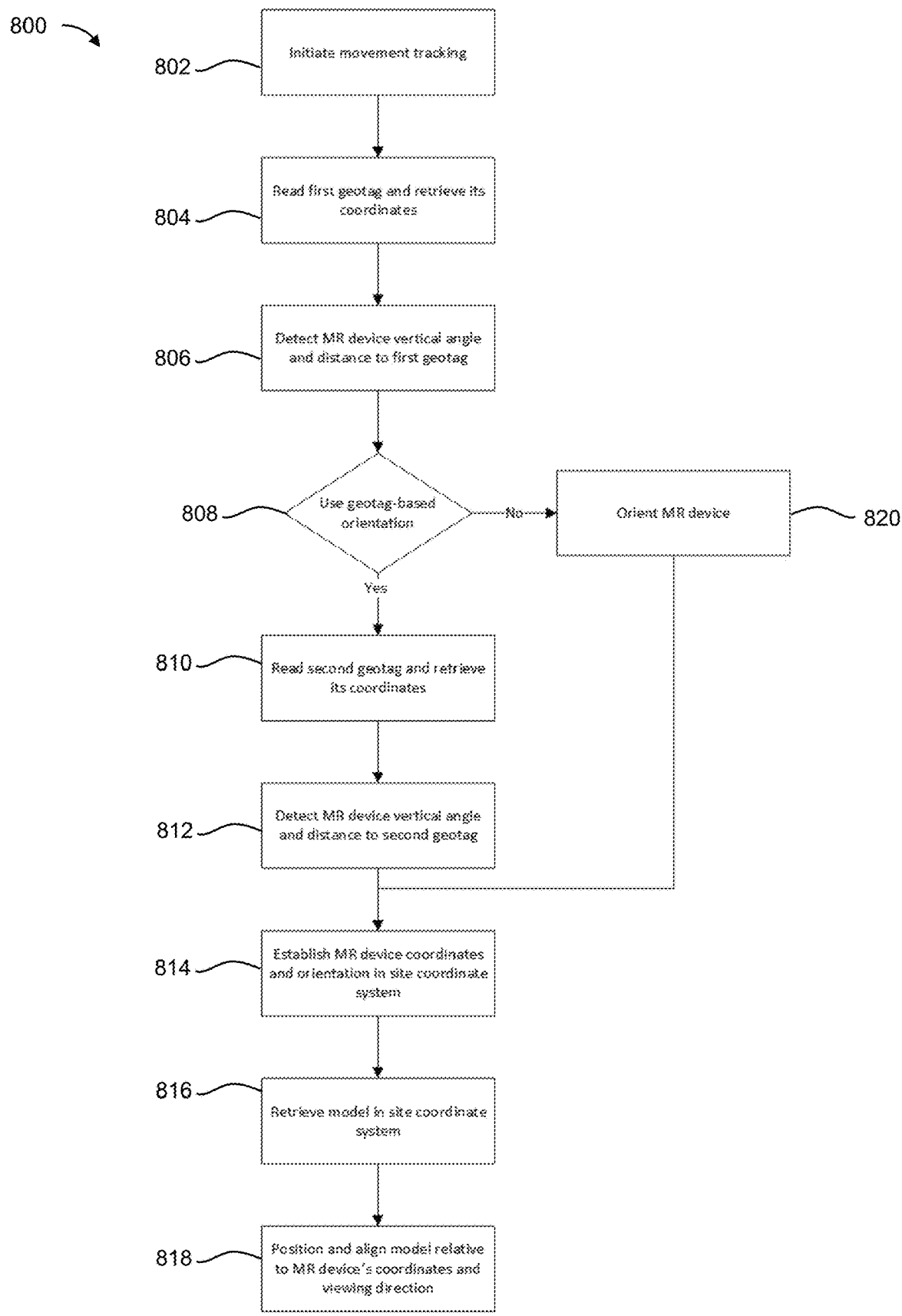
FIG. 8 illustrates an example approach for detecting coordinates of the MR device and displaying a geospatial model relative to the MR device's position.

FIG. 8 illustrates an example approach 800 for utilizing geotags for displaying geospatial data. At block 802, the MR device initiates movement tracking. For example, by utilizing an inertial measurement unit (IMU), camera, or other techniques available to MR devices; such as those with at least 6 DoF (six degrees of freedom tracking) and equipped with SLAM (Simultaneous Localization and Mapping) technology. The movement tracking can determine at least one of pitch, roll and yaw of the MR device, orientation, and movement in order to track and measure the position of the device in three-dimensional (3D) space.

Figure 9:
FIG. 9 illustrates an example of a screenshot of a geotag being scanned with the MR device.

At block 804, the MR device is brought proximate one of the geotags to retrieve the coordinates (i.e., scan) associated with such geotag. FIG. 9 illustrates an exemplary screenshot of scanning of a geotag comprising a QR code.

At block 806, using nearfield technology, surface detection, edge matching, or other approaches, the MR device can detect its distance relative to the geotag in 3D space. The distance of the geotag relative to the MR device is determined in 3D space, and in some cases, along with the vertical plane; for example, whether the geotag is higher or lower and the angle of the location of the geotag relative to the MR device. Additionally, the distance to the geotag can be estimated within acceptable tolerances (each geotag type may provide different accuracy for measuring proximity of geotag).

The distance to the geotag can be determined using any suitable approach; for example, using a strength of signal for beacons or airtags, or using the size of the captured QR code if the actual size of the QR code and the field of view of the camera are known. The vertical angle to the geotag can be determined, for example, using a pitch value determined by sensors (for example, inertial measurement unit (IMU) sensors) located in the MR device.

However, the above can provide challenges for identifying coordinates of the MR device. Although the coordinates of the point marked by geotag are known and the distance and the vertical angle of the MR device relative to the geotag are known, the MR device may not have enough information to determine its orientation in the projection space. Therefore, generally, the coordinates of the MR device can be anywhere within a circle depicted in the example diagram of FIG. 10. Although the MR device needs to detect the coordinates of point $B_1$, without knowing its orientation in the local projection system, it may not know if it were located at point $B_{11}$, or $B_{12}$, or any other point along that circle.

The orientation module 178 determines orientation of the MR device. In an example case, determining orientation can include determining which direction the MR device is oriented towards in the coordinate system, and therefore, where the MR device is in relation to the geotag(s). For example, at block 808 of FIG. 8, in some cases, the user can decide which approach to define the MR device orientation. At block 820, in some cases, the user can orient the MR device manually; for example, by hand, with a compass, using blueprints and a sitemap, or any other approach. For example, with a sitemap, the user can position themselves next to a wall and can rotate a map view displayed on the MR device so that the wall appears next to the user on the map; overlaying the physical wall captured by the camera of the MR device. In another example approach to manual orientation, the user can input a direction they are facing (e.g., fast due-west) when they capture the geotag. In another example approach to manual orientation, the coordinates of the MR device can be determined by a line drawn through a circle of possible values. For example, the orientation module 178 determines device orientation by determining the position of $A_1$ and $A_2$ via the inputs provided by the user.

At block 810, in other cases, the user can orient the MR device by scanning another geotag and retrieving its location information. At block 812, the MR device determines a vertical angle and estimated distance to the second geotag, as described herein.

At block 814, the orientation module 178 can determine the device coordinates and viewing direction in the projection system. By receiving location information from two geotags, the system knows where the MR device is in space relative to both geotags, and therefore, knows its coordinates based on a possible range of values because of the location of the first and second geotag, and the viewing direction in the projection system. FIG. 11 illustrates an example geometric diagram illustrating the range of possible values, and thus, the determination of the MR device orientation in the space.

For example, the orientation module 178 determines the location ($X_{12}$, $Y_{12}$, $Z_{12}$) of a physical point $A_2$ using the same coordinate system as for point $A_1$ and associates this data with a geotag $G_2$ associated with the physical point $A_2$. The orientation module 178 can then determine the location ($X_{22}$, $Y_{22}$, $Z_{22}$) of the mediated reality device's camera $B_2$ relative to the location of the physical point $A_2$. The orientation module 178 can then determine the MR device's orientation by constructing a line $V_1$ through points $B_1$ and $B_2$ and the angle of the mediated reality device's camera relative to the line $V_1$.

In some cases, the method 200 described herein can be used as an initial calibration to establish an initial location and orientation of the MR device for future tracking. In other cases, the method 200 described herein can be performed continuously or periodically to incorporate and correct any changes in viewing angle and location of the current position of the MR device.

Once the MR devices coordinates and orientation are established, the orientation module can determine the coordinates of the position (e.g., X, Y, Z) of the mediated reality device's camera in the projection system and match the virtual pose of the MR device to the coordinates (X, Y, Z) of the mediated reality device's camera in physical space. The device's location and orientation can then be tracked through SLAM or similar approach. At block 816, the orientation module 178 retrieves the model, and at block 818, positions and aligns the model in the MR view relative to the MR pose of the virtual viewpoint.

The output module 180 can then output location information or the geospatial model in the mediated reality view, using the determined virtual pose of the device.

SLAM or similar approaches can be used to ensure that the model is accurately oriented. SLAM and similar approaches provide high accuracy of device tracking. However, such approaches are far from perfect, and eventually, the actual position and orientation of the device will begin deviating from the position determined by such approaches. The MR device can be realigned in space by again performing the manual or two-geotag calibration; or if only a position adjustment is required, by retrieving the location information of the nearest geotag and its position relative to the MR device.

Figure 12:
FIG. 12 illustrates an example of a geotag placed on a wall and scanned on an angle by the MR device.
Figure 13:
FIG. 13 illustrates an example of a virtual marker placed over a scanned geotag in an MR space.

In many cases, the user may not realize that the MR device's position or orientation has "drifted" from the actual position or orientation in physical space. Therefore, the system 150 can assist the user with spotting potential drift. Marking scanned geotags with virtual markers enables the user to visually spot drift situations and correct the model alignment by either scanning the nearest geotag and correcting the orientation, as described herein. FIG. 12 illustrates an example screenshot of a geotag (in this example, a QR code) prior to scanning. While FIG. 13 illustrates an example screenshot of the geotag after scanning with a virtual visual marker overlayed on top of the geotag. As the user moves around, over time the user can check that the visual marker is still positioned overtop of the geotag. If there has been drift and the visual marker is not overlayed properly, the user can proceed to perform the method 200 to recalibrate the viewpoint.

Using geotags to establish and track coordinates of the MR device within the physical space, in accordance with the present embodiments, offers numerous advantages; including being able to work with dynamic models because if dynamic models are used with other approaches, it would require significant updating each time the model changes. Additionally, the present embodiments allow for displaying multiple models at the same time because the location of the MR device is known, and thus, all information available for the physical space can be displayed. The present embodiments also ensure accuracy and help avoid errors because using the geotag information is used to accurately determine physical location.

Advantageously, by conceptually delinking the model from the geotag (the geotag only contains its own positional coordinates, not tied to the model) the mediated reality device location becomes the overlapping consideration. This allows the system 150 to display models in relation to the mediated reality position; instead of necessarily being tied to fixed positions of the geotags.

Although the foregoing has been described with reference to certain specific embodiments, various modifications thereto will be apparent to those skilled in the art without departing from the spirit and scope of the invention as outlined in the appended claims.

The invention claimed is:

1. A computer-executable method for setting a viewpoint for displaying of geospatial object data on a mediated reality (MR) device in relation to a physical space, the physical space comprising one or more geotags each communicating a position of such geotag in the physical space, the method comprising:
   determining a plurality of possible positions of the MR device in a coordinate system representing the physical space by determining a relative angle and distance to one or more of the geotags captured by the MR device;
   determining an orientation of the MR device in the coordinate system representing the physical space using the position information communicated by the one or more geotags captured by the MR device;
   determining a position from the plurality of possible positions of the MR device, in the coordinate system representing the physical space, using the determined orientation of the MR device;
   determining a viewpoint by aligning the determined position and orientation in the coordinate system representing the physical space to a virtual position and pose in a coordinate system in a mediated reality space, wherein aligning the determined position and orientation in the coordinate system representing the physical space to a virtual position and pose in the coordinate system in the mediated reality space comprises aligning a coordinate system grid in the coordinate system representing the physical space to a grid in the mediated reality coordinate system; and
   outputting the viewpoint.

2. The method of claim 1, wherein determining the position of the MR device comprises determining two positions, each of the two physical positions are determined relative to a first and a second of the geotags captured by the MR device, the position of the MR device is tracked between capturing of the first and the second of the geotags, and wherein the orientation is determined by establishing consistency of the alignments of the coordinate system representing the physical and the mediated reality space coordinate system at the two positions.

3. The method of claim 1, wherein the physical orientation is determined by receiving manual setting of the orientation.

4. The method of claim 1, further comprising tracking movements of the mediated reality device in the physical space and periodically correcting the viewpoint in the mediated reality space by determining the position of the MR device, determining the orientation of the MR device, and determining the viewpoint by aligning the determined position and orientation to the virtual position and pose in the mediated reality space.

5. The method of claim 1, wherein outputting the viewpoint comprises displaying the geospatial model by the mediated reality device using the viewpoint.

6. The method of claim 1, wherein the one or more geotags comprise a quick response code, a radio-frequency identification tag, a near field communication tag, or a Bluetooth beacon.

7. The method of claim 1, wherein the one or more geospatial models comprise a plurality of geospatial models, the method further comprising harmonizing projection systems in the plurality of geospatial models.

8. The method of claim 1, wherein the position of each geotag in the physical space is determined by surveying the physical space or by retrieving a position from the one or more geospatial models.

9. The method of claim 1, wherein the geospatial model comprises a reality capture model, computer-aided design (CAD) model, a GIS model, or a building information modeling (BIM) model.

10. A system for setting a viewpoint for displaying of geospatial object data on a mediated reality (MR) device in relation to a physical space, the physical space comprising one or more geotags each communicating a position of such geotag in the physical space, the system comprising one or more processors in communication with a data storage to execute:
   a mediated reality module to determine a plurality of possible positions of the MR device in a coordinate system representing the physical space by determining a relative angle and distance to one or more of the geotags captured by the MR device, to determine an orientation of the MR device in the coordinate system representing the physical space using the position information communicated by the one or more geotags captured by the MR device, and to determine a position from the plurality of possible positions of the MR device, in the coordinate system representing the physical space, using the determined orientation of the MR device;
   an orientation module to determine a viewpoint by aligning the determined position and orientation in the coordinate system representing the physical space to a virtual position and pose in a coordinate system in a mediated reality space, wherein aligning the determined position and orientation in the coordinate system representing the physical space to a virtual position and pose in the coordinate system in the mediated reality space comprises aligning a coordinate system grid in the coordinate system representing the physical space to a grid in the mediated reality coordinate system; and
   an output module to output the viewpoint.

11. The system of claim 10, wherein determining the position of the MR device comprises determining two positions, each of the two positions are determined relative to a first and a second of the geotags captured by the MR device, the position of the MR device is tracked between capturing of the first and the second of the geotags, and wherein the orientation is determined by establishing consistency of the alignments of the coordinate system representing the physical space and the mediated reality space coordinate system at the two positions.

12. The system of claim 10, wherein the orientation is determined by receiving manual setting of the orientation.

13. The system of claim 10, further comprising a tracking module to track movements of the mediated reality device in the physical space, wherein the orientation module periodically corrects the viewpoint in the mediated reality space by aligning an updated position and an updated orientation, both determined by the mediated reality module, to the virtual position and pose in the mediated reality space.

14. The system of claim 10, wherein outputting the viewpoint comprises displaying the geospatial model by the mediated reality device using the viewpoint.

15. The system of claim 10, wherein the one or more geotags comprise a quick response code, a radio-frequency identification tag, a near field communication tag, or a Bluetooth beacon.

16. The system of claim 10, wherein the one or more geospatial models comprise a plurality of geospatial models, the method further comprising harmonizing projection systems in the plurality of geospatial models.

17. The system of claim 10, wherein the position of each geotag in the physical space is determined by surveying the physical space or by retrieving a position from the one or more geospatial models.

18. The system of claim 10, wherein the geospatial model comprises a reality capture model, computer-aided design (CAD) model, a GIS model, or a building information modeling (BIM) model.

* * * * *